No. 738,835. PATENTED SEPT. 15, 1903.
W. C. NEELINGS & E. J. GAY.
LUBRICATOR.
APPLICATION FILED NOV. 27, 1901. RENEWED MAY 4, 1903.
NO MODEL.
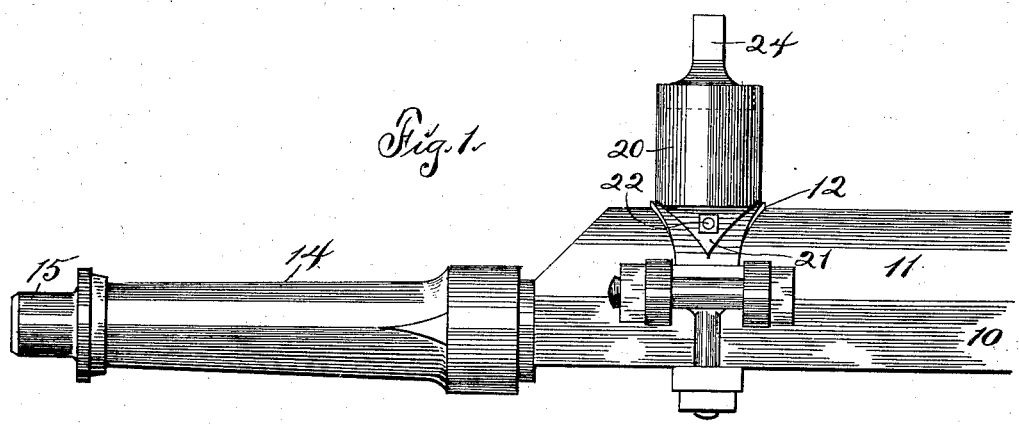
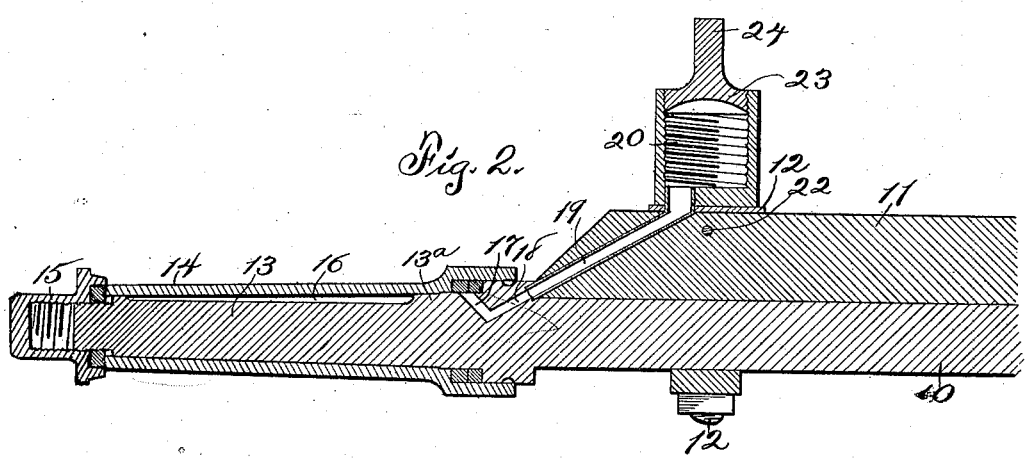
Attest:
W. E. Ellis
Geo. F. White
Inventors:
William C. Neelings and
Eugene J. Gay.
By H. C. Sweet Att'y No. 738,835. Patented September 15, 1903.

UNITED STATES PATENT OFFICE.

WILLIAM C. NEELINGS AND EUGENE J. GAY, OF ALGONA, IOWA; SAID NEELINGS ASSIGNOR TO SAID GAY.

LUBRICATOR.

SPECIFICATION forming part of Letters Patent No. 738,835, dated September 15, 1903.

Application filed November 27, 1901. Renewed May 4, 1903. Serial No. 155,680. (No model.)

*To all whom it may concern:*

Be it known that we, WILLIAM C. NEELINGS and EUGENE J. GAY, both citizens of the United States of America, and residents of Algona, Kossuth county, Iowa, have jointly invented certain new and useful Improvements in Lubricators, of which the following is a specification.

The object of this invention is to provide means for lubricating an axle of a carriage, wagon, buggy, or other wheeled truck with "hard-oil" or other lubricant without removing a wheel from said axle or loosening the attachment thereto.

Our invention consists in the construction, arrangement, and combination of elements hereinafter set forth, pointed out in our claim, and illustrated by the accompanying drawings, in which—

Figure 1 is a side elevation of an axle, showing an axle-skein mounted thereon and our improved lubricator attached in position for practical use. Fig. 2 is a longitudinal section of the device shown in Fig. 1.

In the construction and mounting of the device, as shown, the numeral 10 designates an ordinary axle-bar, preferably made of iron or steel and surmounted by an axletree 11, of wood, attached thereto by a clip 12 in a common manner. An axle 13 is formed on or welded to one end of the axle-bar 10, and an axle-skein 14 is shown mounted on the axle and secured by an axle-nut 15 in a common manner. The axle 13 is formed with a cylindrical portion 13ᵃ at its inner end and a groove 16 in and longitudinally of the periphery of its tapering body portion, one end of the groove being adjacent the cylindrical portion and the other end of said groove being near the outer end of the axle. A hole 17 is formed in the cylindrical portion of the axle 13 at an angle to the tread thereof and extending inward from the periphery toward the center of the axle-bar. A passage 18 is formed in the inner end of the axle leading from the top of the axle-bar to and communicating with the hole 17 at its inner end. A pipe 19 is mounted obliquely in the outer end portion of the axletree 11 and enters at its outer end the inner end of the passage 18. A cup 20 is mounted on the upper rounded portion of the clip 12 and is formed with lips 21 21, only one of which is shown, depending on each side of and embracing said clip. It is the function of the lips to brace the cup on the clip and form a seat on the rounded upper surface thereof, and a bolt 22 is mounted through said lips and clip and securely seats the cup on the clip removably and replaceably. The upper end of the pipe 19 extends through the bottom of the cup 20 and secures said cup to the clip as well as communicates with the interior thereof. The cup 20 is of cylindrical form and is interiorly screw-threaded. A plug 23 is screwed into the cup 20 and is formed with a stem 24, angular in cross-section and centrally located on its upper end. It will be observed that the plug is relatively thin and is concaved in its lower surface. Thus is provision made for the storage of a considerable supply of hard-oil or other lubricant in the cup beneath the plug when the plug is removed.

The insertion of the plug forces a portion of the lubricant into the pipe 19, passage 18, and hole 17, thus providing space for the firm mounting of the plug, as shown. Further screwing of the plug 23 into the cup by means of a wrench applied to the stem 24 will force a portion of the lubricant out of the hole 17 upon the periphery of the cylindrical portion 13ᵃ of the axle 13, where it is received by the axle-skein 14 and spread evenly over the axle. Any surplus of lubricant forced into the bearing will enter the groove 16 and spread therefrom as required. By reason of the materially less width of the stem 24 than the diameter of the plug 23 a wrench may follow said stem into the cup and screw the plug entirely to the bottom thereof. The concave in the bottom of the plug provides a chamber to hold lubricant after the plug has reached the limit of its inward movement, thus insuring the presence of lubricant even after the operator ascertains that he can no longer force it from the cup.

We claim as our invention—

In a lubricator for vehicles, the combination of an axle formed with a groove 16 longitudinally of the upper portion of its periphery and a hole 17 formed in the inner end portion of the axle 13 and at an angle to the trend thereof extending inward and downward from the periphery toward the center, the outer end of said hole being spaced apart from the adjacent end of the groove 16, a passage 18 being formed in the inner end of the axle and leading from the top of the axle-bar downward and outward to a point of communication with the hole 17, an axletree 11 mounted on the axle-bar, a clip mounted removably and replaceably on and connecting the axletree and axle-bar, a pipe 19 mounted obliquely through the axletree in alinement and communicating with the upper end of the passage 18, the upper end of said pipe extending through the clip, an oil-cup mounted on said clip and formed with a hole in its bottom connected with the upper end of the pipe 19, lips on said cup embracing said clip, a bolt mounted through said lips and clip and a plug formed with a concaved bottom, screwed into said cup.

Signed at Algona, Iowa, this 18th day of September, 1901.

WILLIAM C. NEELINGS.
EUGENE J. GAY.

In presence of—
E. BLACKFORD,
W. H. REED.